June 5, 1956 W. K. WYATT 2,748,426
APPARATUS FOR PRODUCING STAPLE FIBERS
Filed June 12, 1953 14 Sheets-Sheet 2
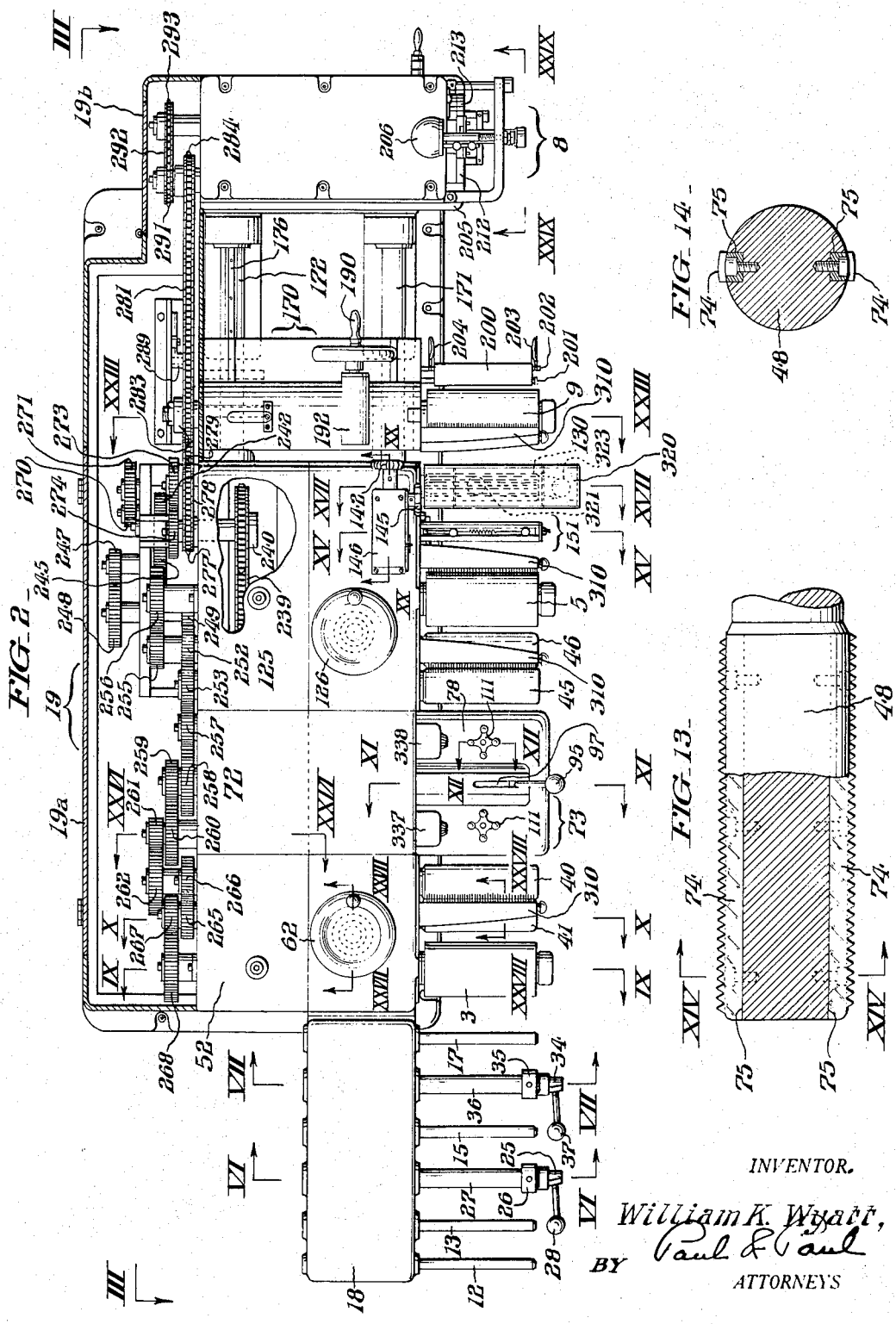
INVENTOR.
William K. Wyatt,
BY Paul & Paul
ATTORNEYS

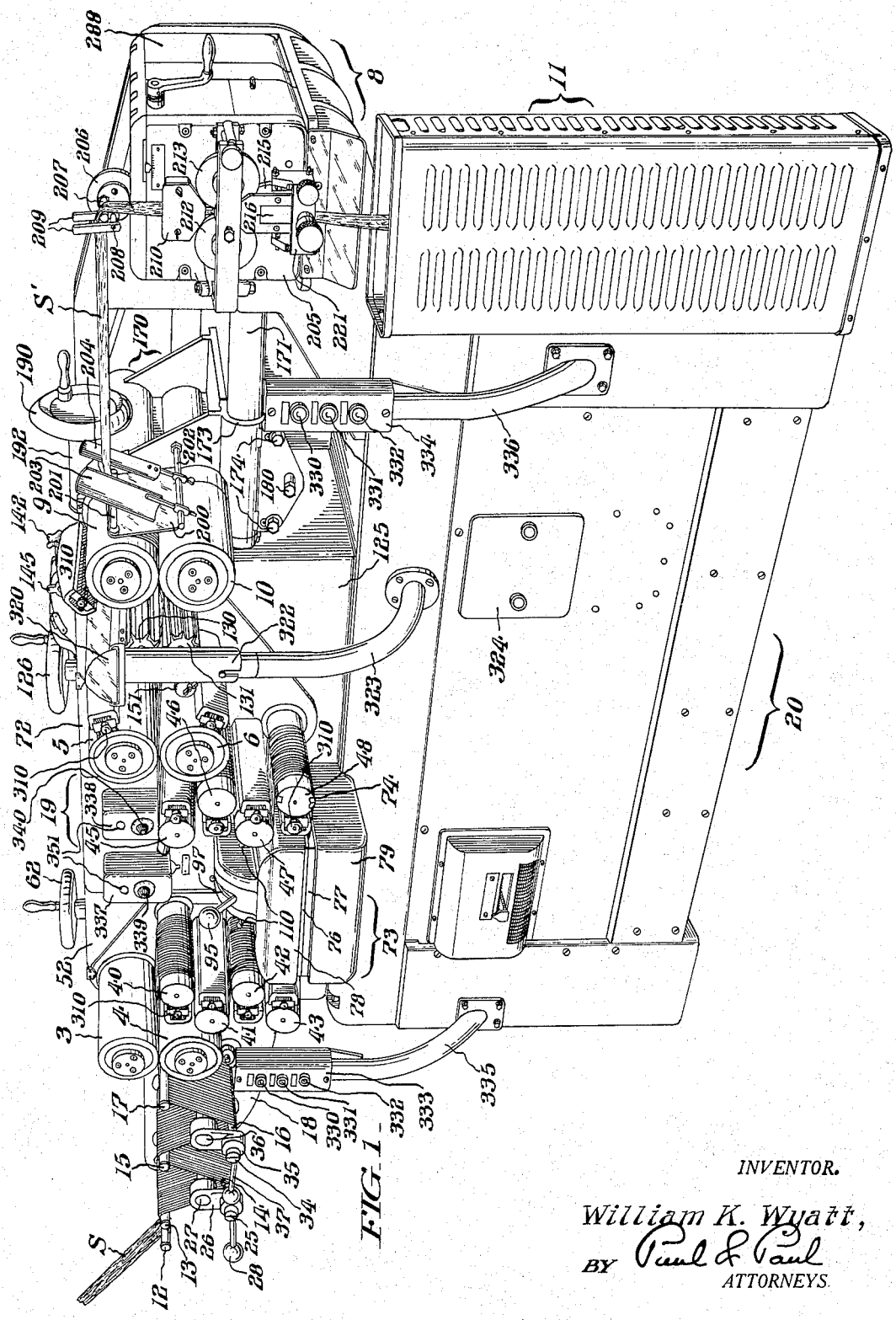

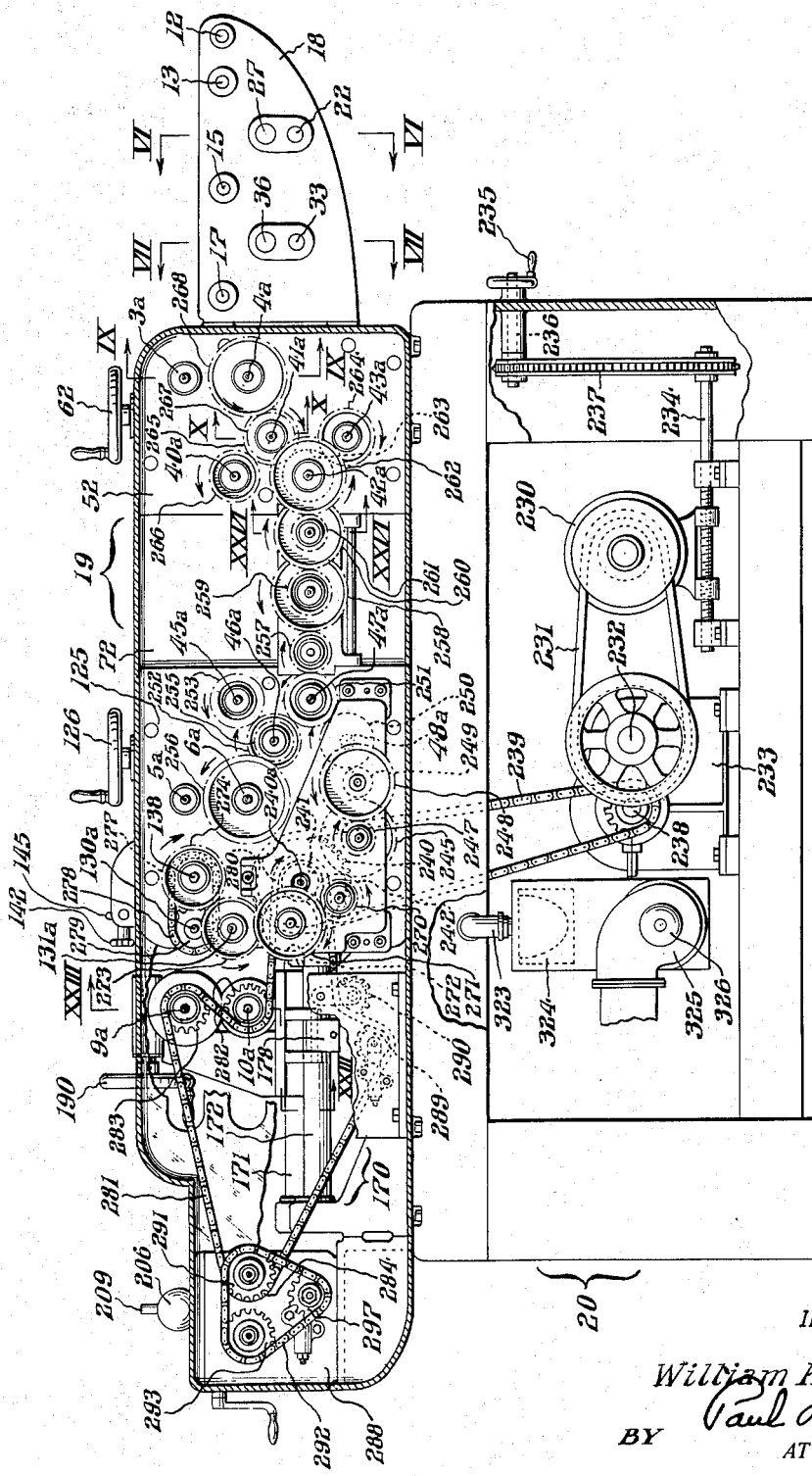

June 5, 1956  W. K. WYATT  2,748,426
APPARATUS FOR PRODUCING STAPLE FIBERS
Filed June 12, 1953  14 Sheets-Sheet 4
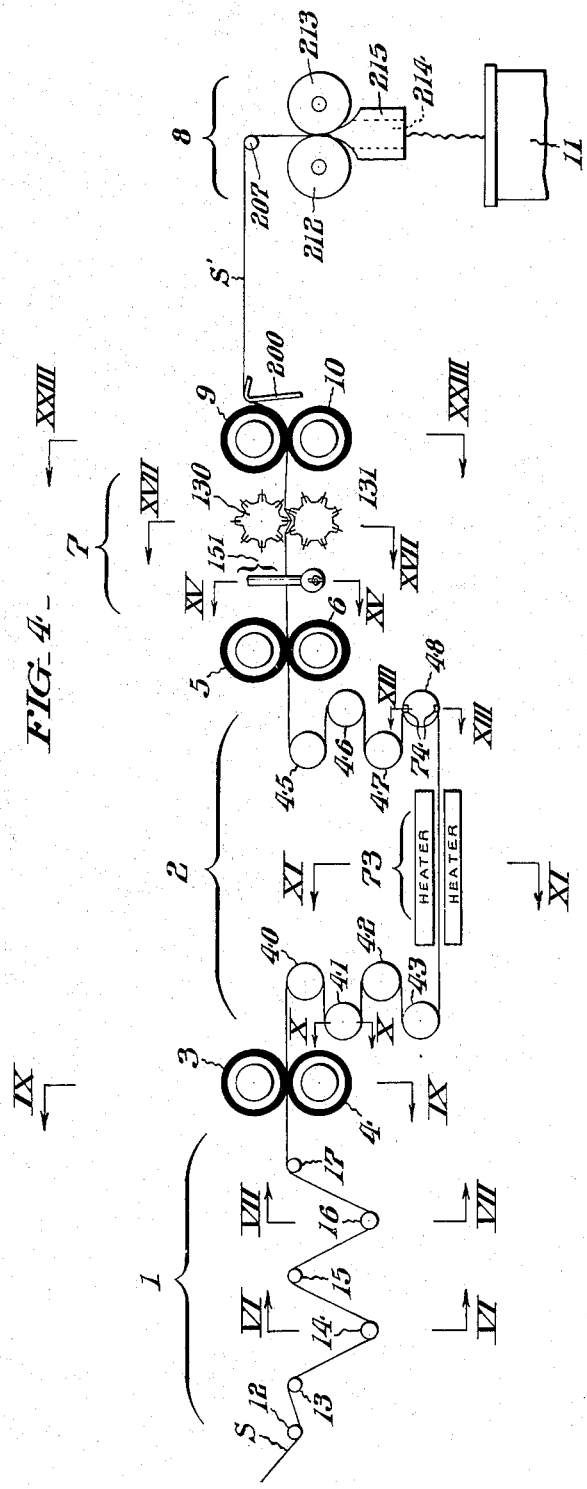
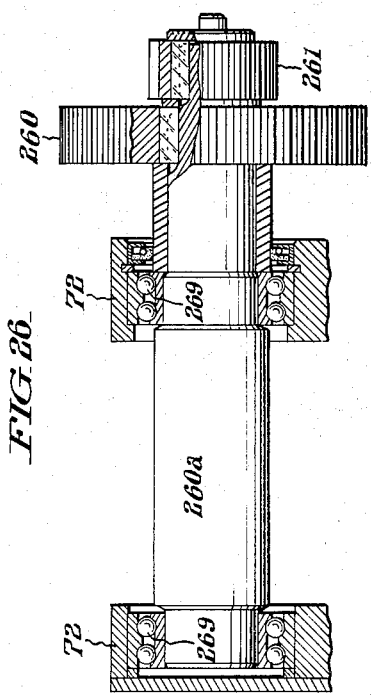
INVENTOR.
William K. Wyatt,
BY Paul & Paul
ATTORNEYS.

June 5, 1956 W. K. WYATT 2,748,426
APPARATUS FOR PRODUCING STAPLE FIBERS
Filed June 12, 1953 14 Sheets-Sheet 5
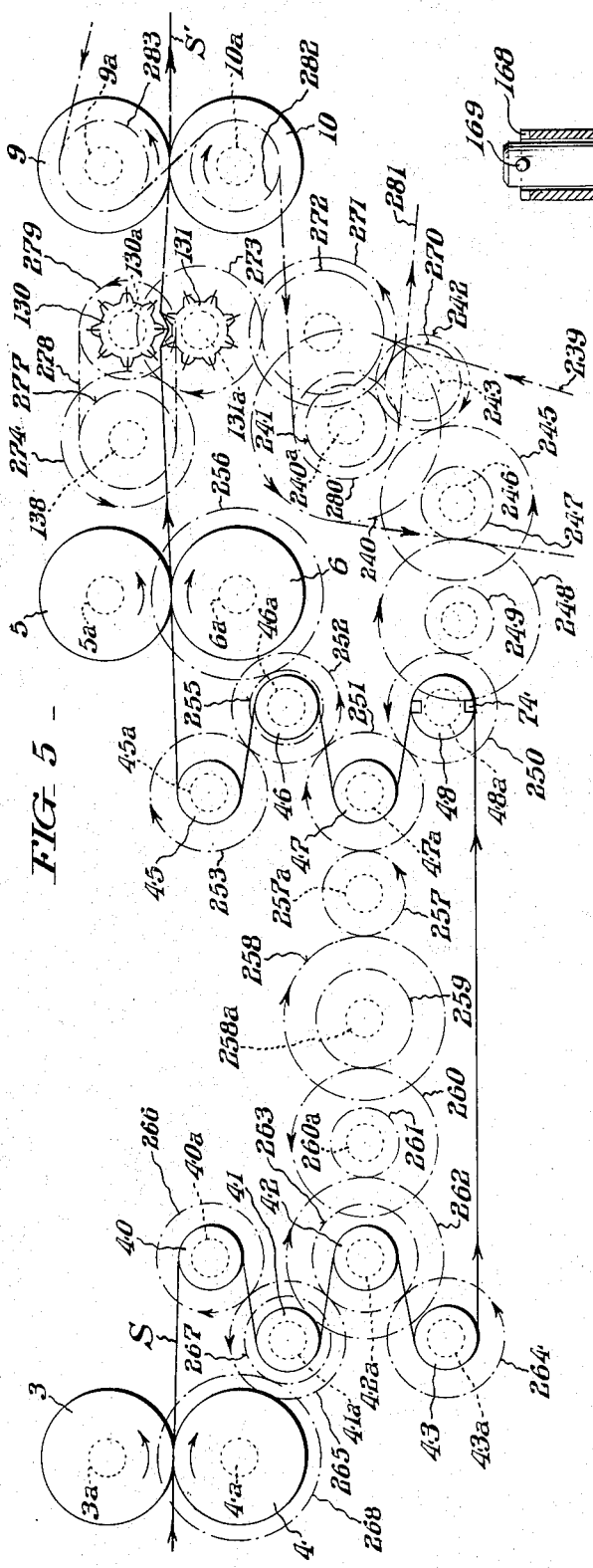
INVENTOR.
William K. Wyatt,
BY Paul & Paul
ATTORNEYS

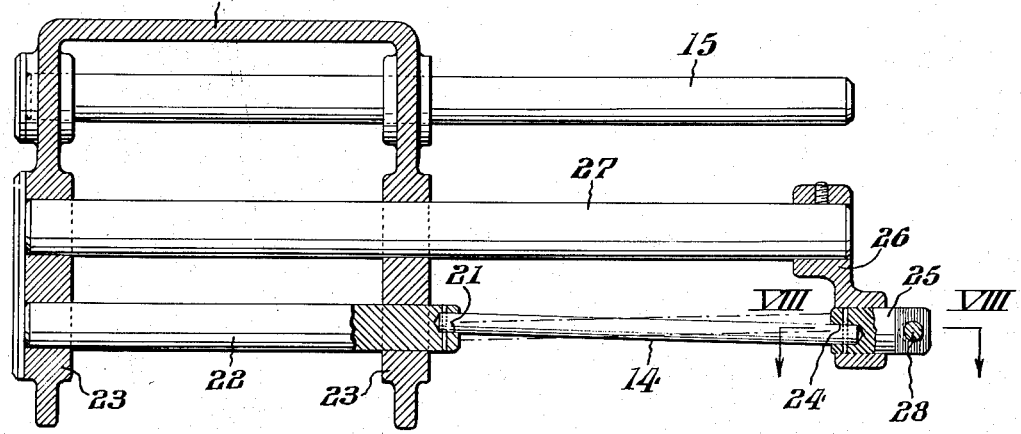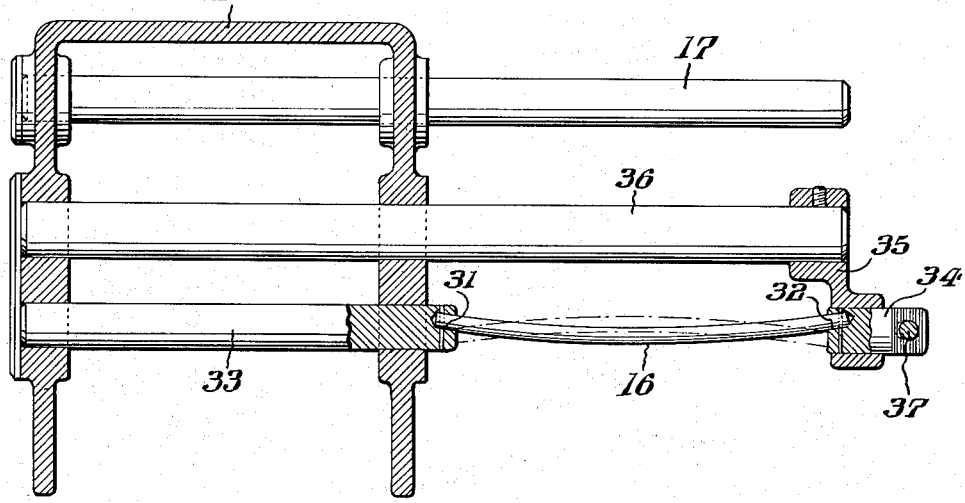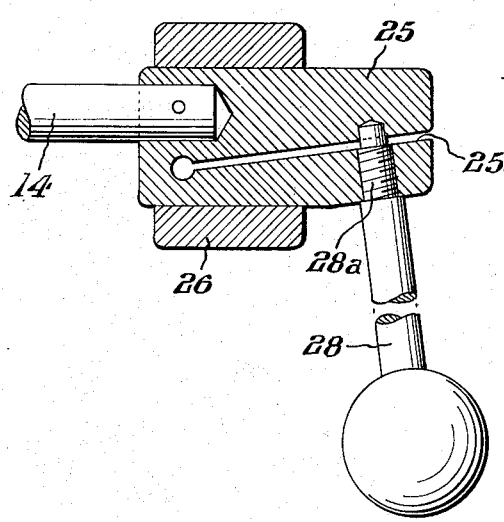

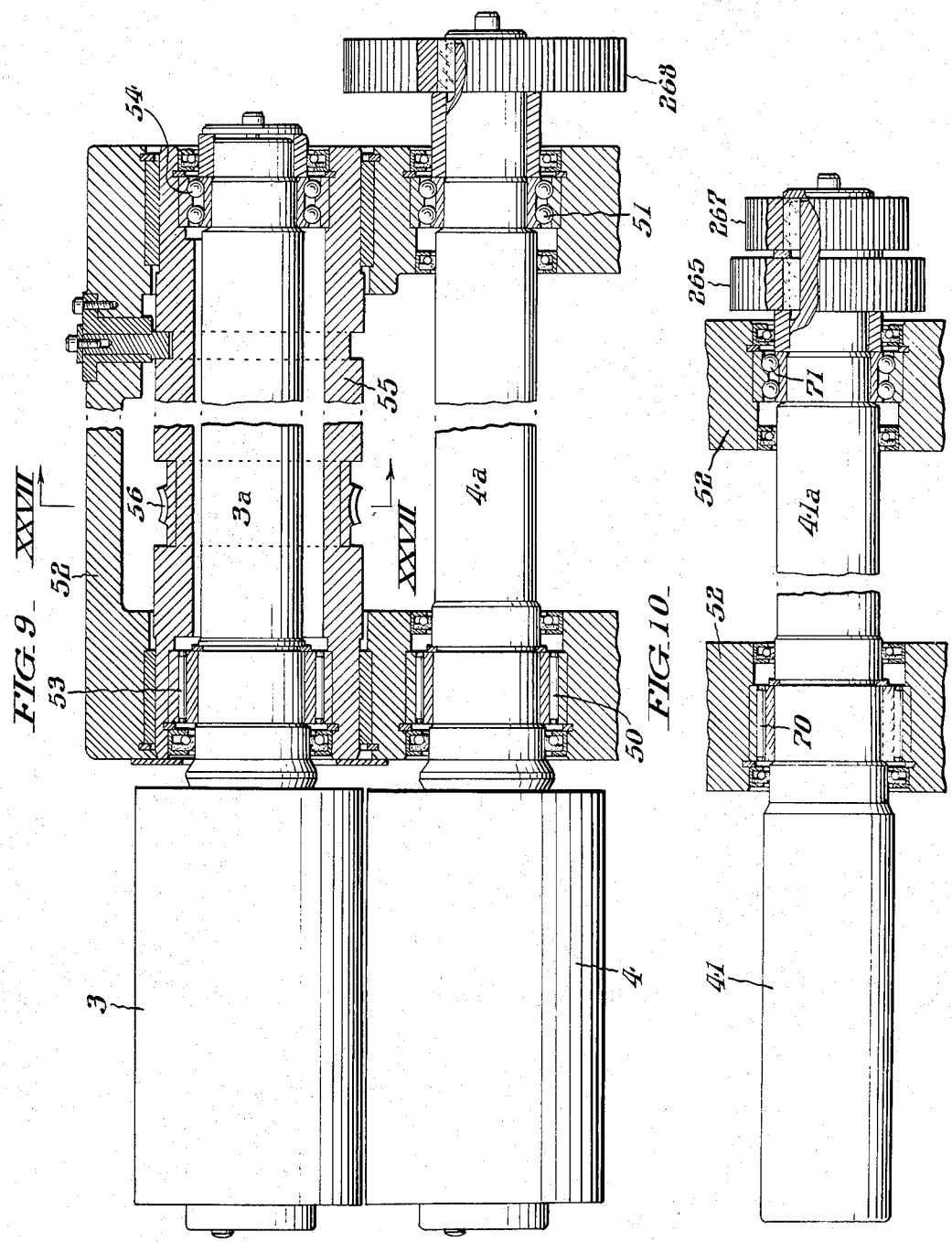

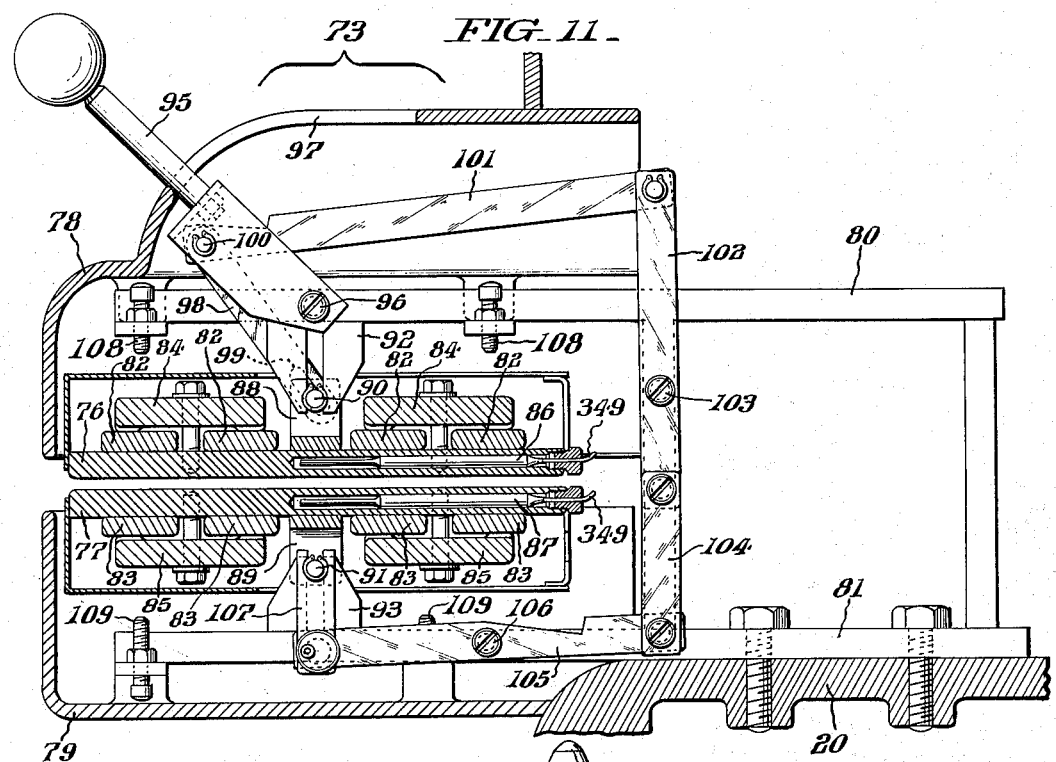
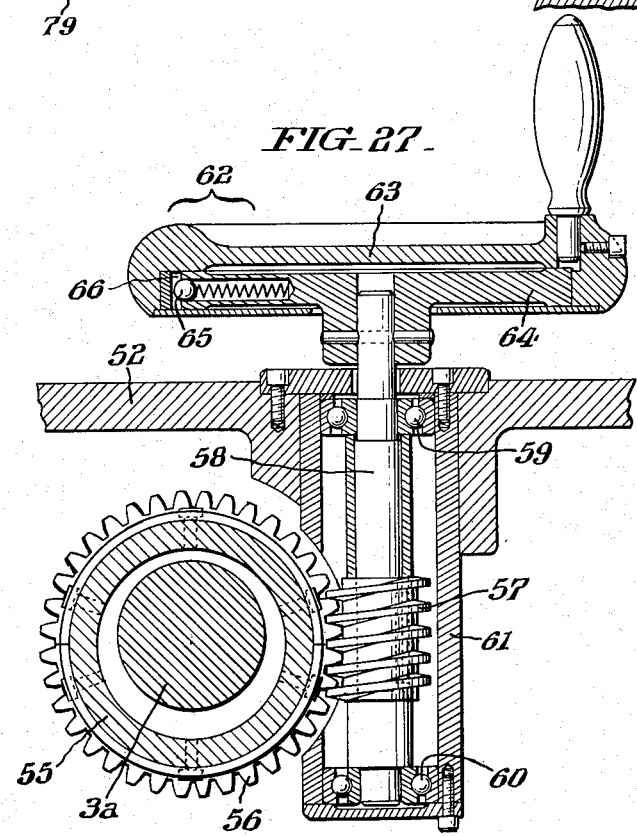
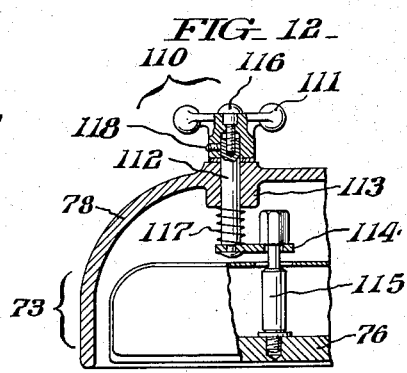

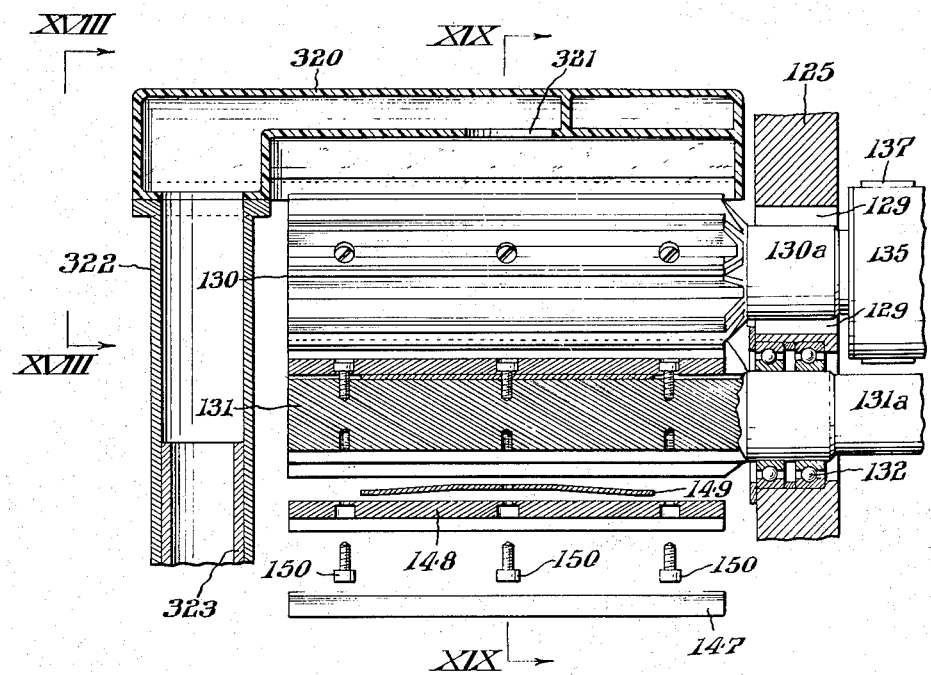
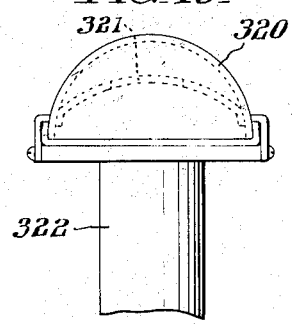
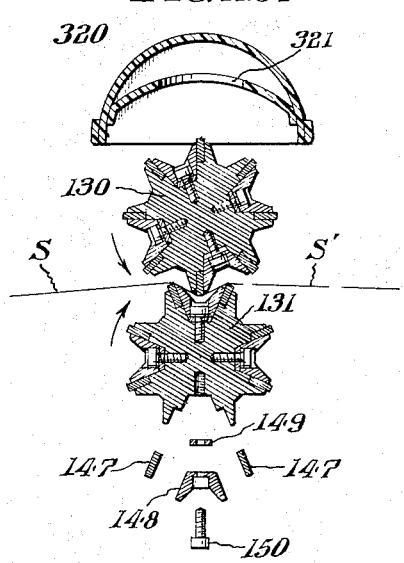

June 5, 1956  W. K. WYATT  2,748,426
APPARATUS FOR PRODUCING STAPLE FIBERS
Filed June 12, 1953  14 Sheets-Sheet 10
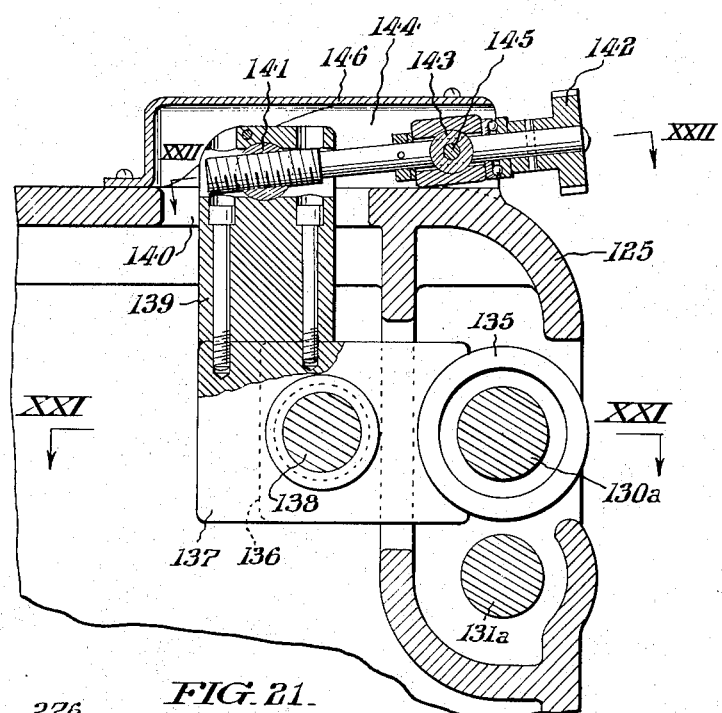
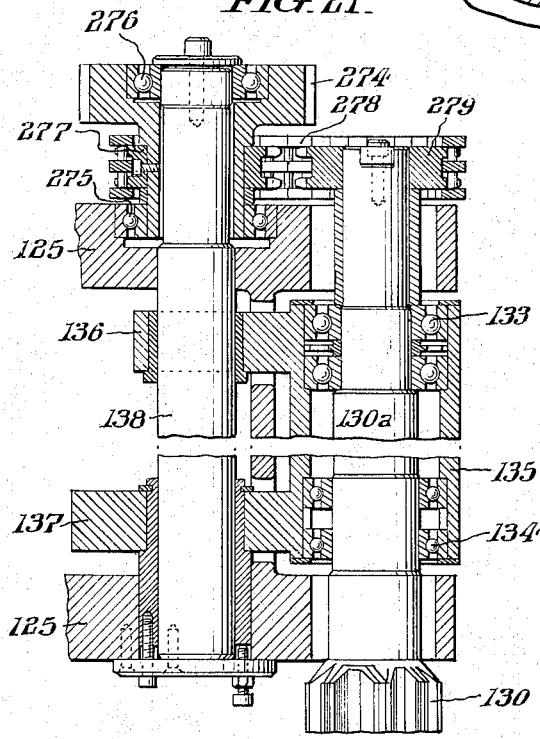
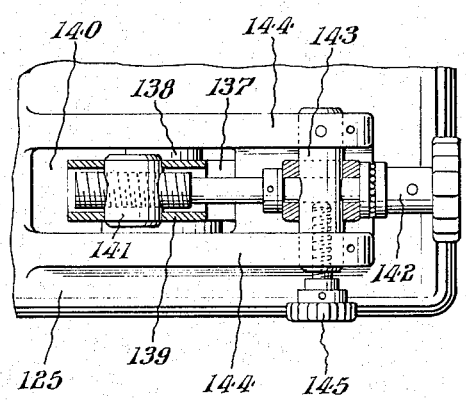
INVENTOR.
William K. Wyatt,
BY Paul & Paul
ATTORNEYS

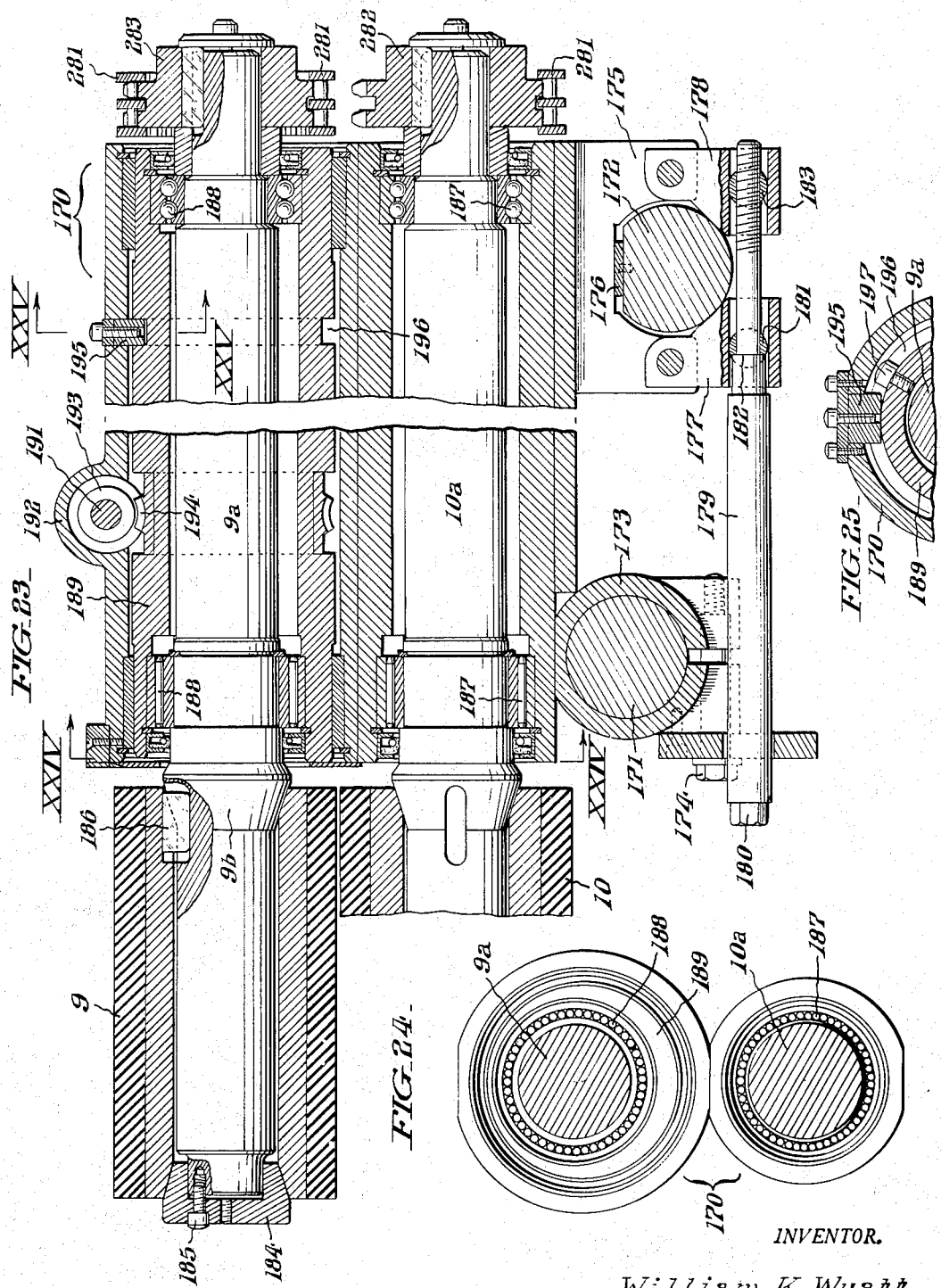

June 5, 1956 W. K. WYATT 2,748,426
APPARATUS FOR PRODUCING STAPLE FIBERS
Filed June 12, 1953 14 Sheets-Sheet 12
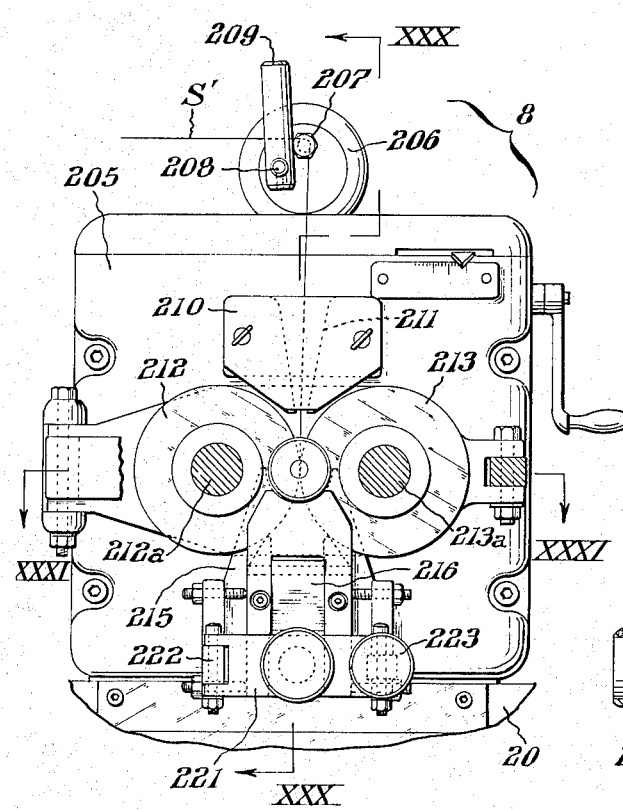
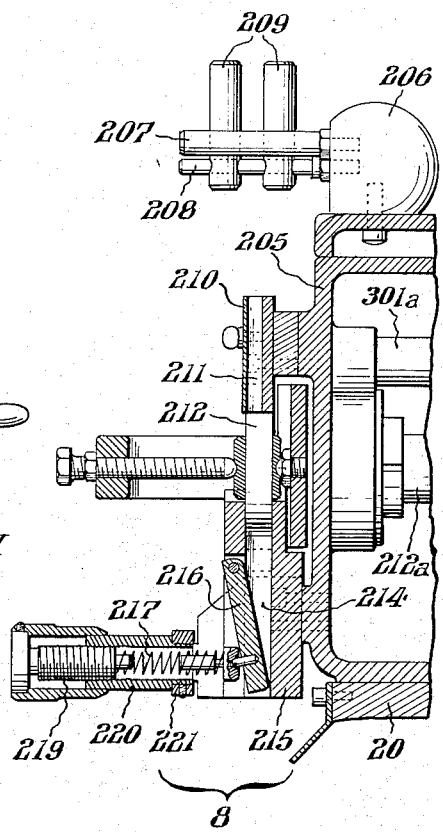
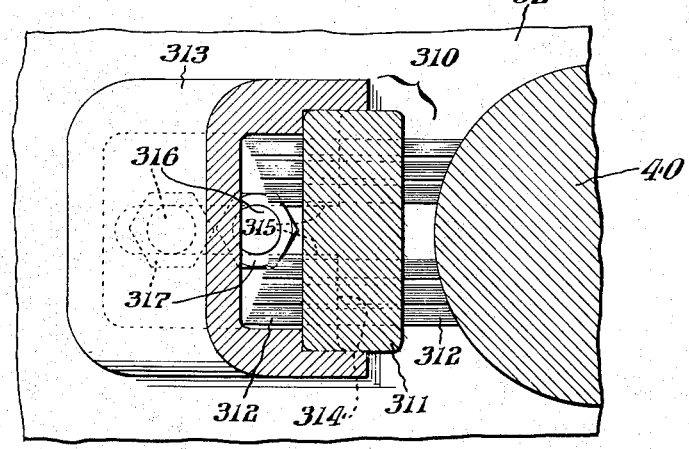
INVENTOR.
William K. Wyatt,
BY Paul & Paul
ATTORNEYS.

June 5, 1956 W. K. WYATT 2,748,426
APPARATUS FOR PRODUCING STAPLE FIBERS
Filed June 12, 1953 14 Sheets-Sheet 13
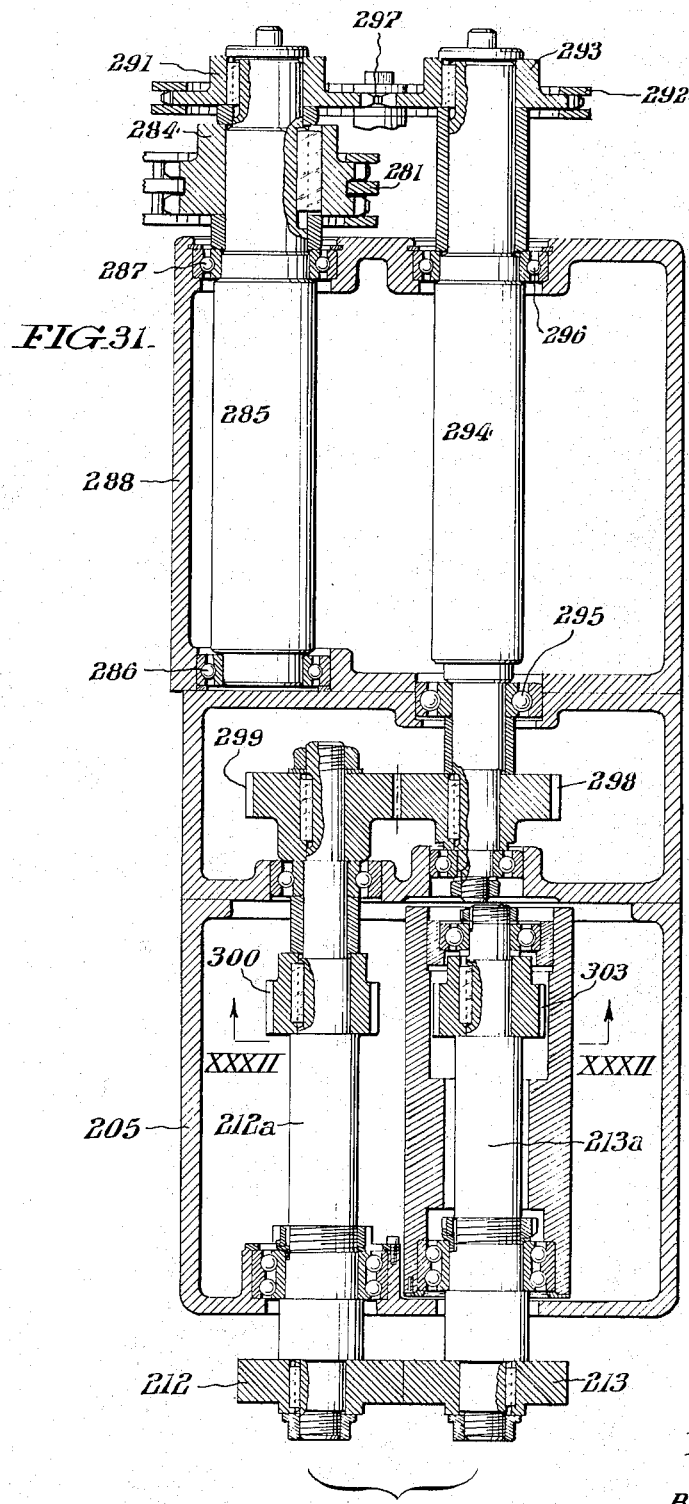
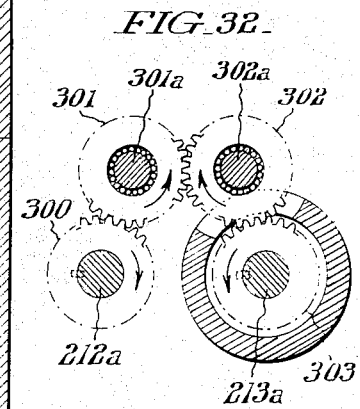
INVENTOR.
William K. Wyatt,
BY Paul & Paul
ATTORNEYS

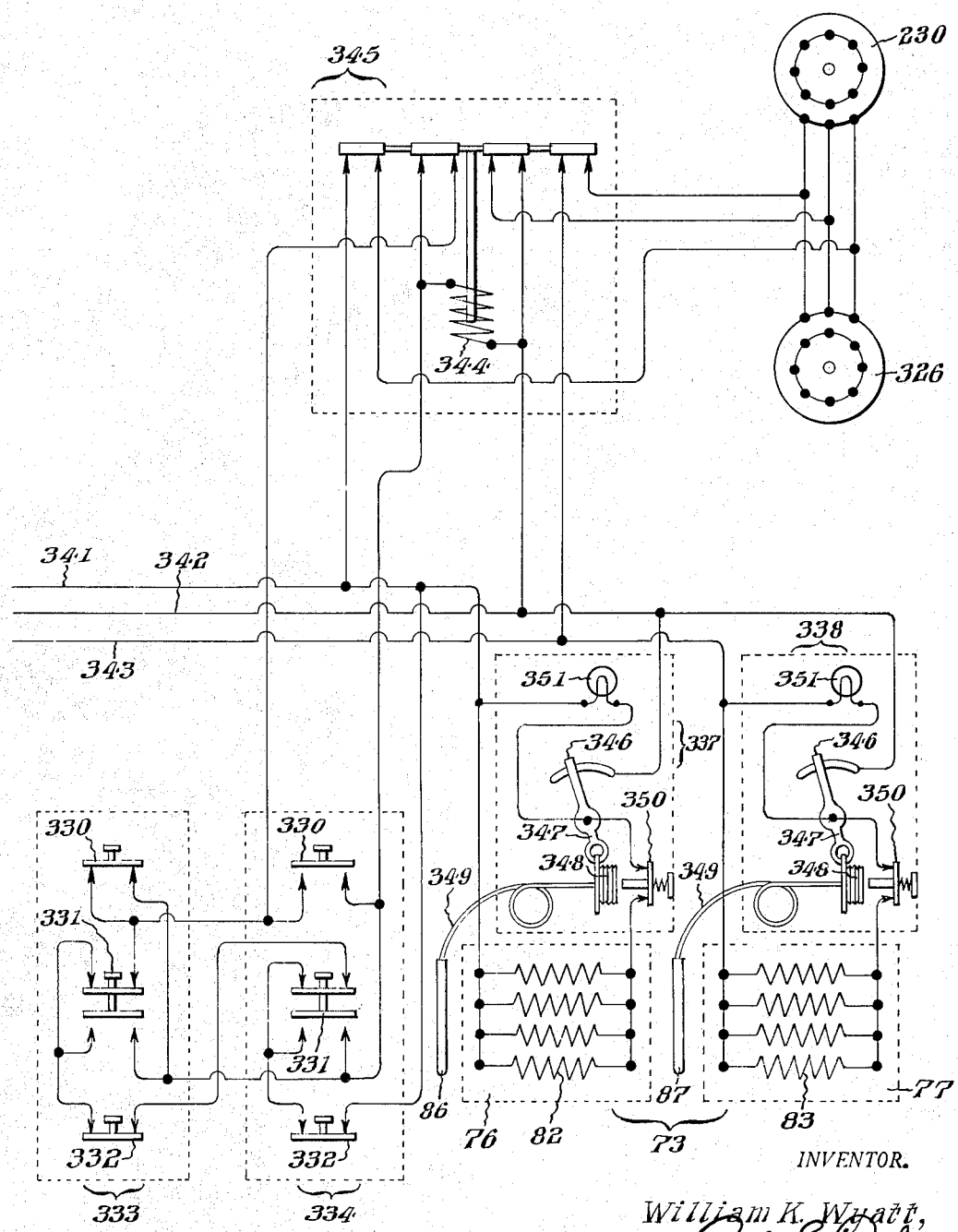

United States Patent Office 2,748,426
Patented June 5, 1956

2,748,426
APPARATUS FOR PRODUCING STAPLE FIBERS

William K. Wyatt, Souderton, Pa., assignor to Turbo Machine Company, Lansdale, Pa., a corporation of Pennsylvania Application June 12, 1953, Serial No. 361,292

28 Claims. (Cl. 19—.37)

This invention relates to apparatus for producing staple fibers, that is to say, to apparatus for breaking up synthetic textile filaments of nylon or the like into fibers of staple lengths. More specifically, my invention has reference to apparatus generally of the type disclosed in U. S. Patent No. 2,419,320, granted to J. L. Lohrke on April 22, 1947. In this patented apparatus, tow consisting of multiple filaments, after being laterally spread into the form of a sheet and tensioned, is passed horizontally through a spacial interval between a pair of upper and lower feed nip rolls and a pair of upper and lower delivery nip rolls rotating at a somewhat faster speed, and while thus strained, the filaments are broken up into fibers of staple length by the action of a cooperating pair of longitudinally grooved breaker rolls without destroying the continuity of the resulting sliver, after which the sliver is directed from the delivery rolls to a crimping mechanism for curling of the fibers in preparation for the spinning of the sliver into yarn suitable for weaving and/or knitting purposes.

Amongst the aims of my invention are:

To provide, in connection with apparatus of the kind referred to, improved snubber means for laterally spreading the tow into sheet form, tensioning the filaments and, at the same time, centralizing the sheet before entry between the feed rolls.

To provide for the support of snubber bars, the feed rolls, the delivery rolls and the breaker elements, as well as for temporary retraction of the upper feed and delivery rolls relative to the lower feed and delivery rolls and of the upper breaker roll relative to the lower breaker roll to facilitate initial threading of the tow in the apparatus.

To provide improved breaker rolls wherein the portions which directly contact the filaments of the tow are separately formed and removably secured with capacity for ready replacement when they have become worn after protracted use.

To provide means whereby the filaments, after lateral spreading of the tow by the snubber means, are subjected to the action of heat and softened, and incidentally stretched or drafted to a predetermined extent enroute to the feed rolls.

To provide improved drive mechanism by which the various nip rolls, the breaker rolls, and the nip rolls embodied in the crimping mechanism are all positively driven at the required differential speeds; and which, without necessitating dismantling of any of its components, will permit the delivery rolls to be positionally adjusted relative to the breaker rolls for change in the length of the fibers produced from the filaments.

Other objects and attendant advantages will appear from the following detailed description of the attached drawings, wherein:

Fig. 1 is a perspective view of a staple fiber producing apparatus conveniently embodying my invention.

Fig. 2 is a view of the apparatus in top plan, with a portion of its casing shown in horizontal section to expose details of the drive mechanism which would otherwise be hidden.

Fig. 3 is a longitudinal sectional view of the apparatus taken as indicated by the angled arrows III—III in Fig. 2.

Fig. 4 is a diagrammatic view showing the apparatus in front elevation.

Fig. 5 is a diagrammatic view on a large scale corresponding to Fig. 4 and showing the drive mechanism of the apparatus.

Figs. 6 and 7 are transverse sections taken as indicated respectively by the angled arrows VI—VI and VII—VII in Figs. 2, 3 and 4.

Fig. 8 is a detail section taken as indicated by the angled arrows VIII—VIII in Fig. 6.

Figs. 9 and 10 are transverse sections taken as indicated by the angled arrows IX—IX, X—X in Figs. 2, 3 and 4.

Fig. 11 is a transverse section taken as indicated by the angled arrows XI—XI in Figs. 2 and 4.

Fig. 12 is a detail section taken as indicated by the angled arrows XII—XII in Fig. 2.

Fig. 13 is a detail section taken as indicated by the angled arrows XIII—XIII in Fig. 4.

Fig. 14 is a detail section taken as indicated by the angled arrows XIV—XIV in Fig. 13.

Fig. 15 is a transverse section taken as indicated by the angled arrows XV—XV in Figs. 2 and 4.

Fig. 16 is a detail section taken as indicated by the angled arrows XVI—XVI in Fig. 15.

Fig. 17 is a detail section taken as indicated by the angled arrows XVII—XVII in Figs. 2 and 4.

Fig. 18 is a detail view in elevation looking as indicated by the angled arrows XVIII—XVIII in Fig. 17.

Fig. 19 is a detail section taken as indicated by the angled arrows XIX—XIX in Fig. 17.

Fig. 20 is a fragmentary transverse section taken as indicated by the angled arrows XX—XX in Fig. 2.

Figs. 21 and 22 are detail sections taken as indicated respectively by the angled arrows XXI—XXI and XXII—XXII in Fig. 20.

Fig. 23 is a transverse section taken as indicated by the angled arrows XXIII—XXIII in Figs. 2, 3 and 4.

Fig. 24 is a detail section taken as indicated by the angled arrows XXIV—XXIV in Fig. 23.

Fig. 25 is a fragmentary view in section taken as indicated by the angled arrows XXV—XXV in Fig. 23.

Fig. 26 is a transverse section taken as indicated by the angled arrows XXVI—XXVI in Figs. 2 and 3.

Fig. 27 is a detail section taken as indicated by the angled arrows XXVII—XXVII in Figs. 2 and 9.

Fig. 28 is a detail section taken as indicated by the angled arrows XXVIII—XXVIII in Fig. 2.

Fig. 29 is a view looking as indicated by the angled arrows XXIX—XXIX in Fig. 2 and showing the crimping mechanism in front elevation, with portions thereof broken away and in section for exposure of important structural details.

Fig. 30 is a fragmentary view in cross section taken as indicated by the angled arrows XXX—XXX in Fig. 29.

Fig. 31 is a fragmentary view in horizontal section taken as indicated by the angled arrows XXXI—XXXI in Fig. 29.

Fig. 32 is a detail section taken as indicated by the angled arrows XXXII—XXXII in Fig. 31; and Fig. 33 is a wiring diagram of various electrical appurtenances embodied in the apparatus.

The apparatus in general

From Figs. 1 and 4 it will be noted that my improved apparatus, as there illustrated, is basically like that of the Lorke patent, hereinbefore referred to, in that it comprises a means 1 for centering and spreading the filaments of the tow S laterally into the form of a sheet for progression through the apparatus from left to right; a tensioning means 2 to which the tow is fed from the means 1 by a pair of superposed cooperative nip rolls 3, 4 and from which the tow is advanced by another pair of superposed cooperative nip rolls 5, 6 and to the breaker means comprehensively designated 7; and a crimping mechanism 8 to which the sliver is directed, after breaking of the filaments into staple fibers, by another pair of superposed cooperative nip rolls 9, 10, the crimped sliver S' being continuously discharged into a suitable receiver 11. As will be seen presently, the several means 1, 2, 7 and 8 are all of improved construction.

The spreading and centering means

This means 1 is unique in that it is constituted, as best shown in Figs. 1, 2, 4 and 6–8, by a plurality of non-rotating round section snubber bars 12, 13, 14, 15, 16 and 17 which are staggeringly arranged and which project forwardly from a bracket extension 18 at one end of a casing 19 containing part of the drive mechanism of the apparatus, said casing being sustained at a suitable elevation from the floor by a sub-housing 20. Each of the upper snubber bars 13, 15 and 17 is fixedly anchored at one end in bracket 18 after the manner illustrated in Fig. 6. One of the lower bars, i. e., the bar 14, has one of its ends secured in an eccentrically-disposed socket 21 in the corresponding end of a shaft 22 engaged in spaced bearing bosses 23 of the bracket 18. The opposite end of bar 14 is similarly secured in an eccentrically-disposed socket 24 in the corresponding end of a short shaft 25 which is rotatively supported, in coaxial relation to shaft 22, in a pendant bearing arm 26 at the outer end of a rod 27 fixed in said bracket. Short shaft 25 is split as at 25a in Fig. 8 and provided with a handle 28 having a threaded connection 28a with said shaft. By means of handle 28, shafts 22 and 25 can be turned to change the angularity of bar 14 as may be required for centering of the tow S, and secured in adjusted position by taking up upon the threaded connection 28a to spread the split portion of shaft 25 within the boss of bearing arm 26. The other lower snubber bar 16, see Fig. 7 is bowed, and has its opposite ends secured in eccentrically disposed sockets 31 and 32 respectively in a shaft 33 rotatively borne in bracket 18, and in a short shaft 34 rotatively borne in a pendent bracket arm 35 at the outer end of a fixed rod 36. Short shaft 34 is split, like shaft 25a, and provided with a screw handle 37 whereby it may be turned to adjust the curved bar 16 as may be required to laterally spread the tow to the desired extent, and afterwards secured in adjusted position.

Tensioning means

In addition to the nip rolls 3, 4, the tensioning means 2 includes two groups of smaller auxiliary rolls 40, 41, 42, 43 and 45, 46, 47, 48 respectively arranged in staggered relation vertically, the first group adjacent said nip rolls 3 and 4, and the second group immediately adjacent the nip rolls 5 and 6. Nip rolls 3 and 4 are rubber sheathed and removably secured to the outboard ends of shafts 3a and 4a which, see Fig. 9, extend rearwardly into casing 19. As shown, shaft 4a of roll 4 is rotatively supported in anti-friction bearings 50 and 51 set into a stationary hollow box-like frame section 52 within casing 19 containing oil for lubrication of said bearings and other enclosed moving parts. Shaft 3a of roll 3 is rotatively supported in anti-friction bearings 53 and 54 eccentrically set into an oil filled sleeve 55 which is rotatably regulatable in frame section 52 for adjustment of roll 3 into and out of operative pressure contact with roll 4. For the purpose of rotating sleeve 55 (see Figs. 9 and 27) it is provided with a worm gear 56 which meshes with a worm 57 on a vertical shaft 58, the latter being rotatively supported by anti-friction bearings 59 and 60 within a tubular oil filled holder 61 fitted downwardly into frame section 52 from the top. Connected to the upper protruding end of shaft 58 is a hand wheel 62 which is composed of two coaxial parts 63 and 64, part 64 being pinned to said shaft and recessed into part 63. A spring-backed ball 65 confined in a radial socket in part 64 serves, by engaging a notch 66 in the internal periphery of part 63, to connect these parts for rotation together. Upon contact of roll 3 with roll 4, however, ball 65 will yield to release part 63 of wheel 62 after the contact is made and so limit the pressure exerted upon the sliver as it passes between said rolls. Upper nip roll 3 is journalled in an oil-filled sleeve as shown and rotated solely through contact with lower nip roll 4 which is positively rotated by the drive mechanism as later described herein.

Auxiliary rolls 40—43 are plain surfaced and formed at the outboard ends of shafts 40a—43a which, as instanced in Fig. 10, are rotatively supported in anti-friction bearings 70 and 71 within frame section 52, and all of them are positively driven at the same surface speed as nip roll 4. The shafts 45a—48a of auxiliary rolls 45—48 are similarly supported rotatively in a separate stationary hollow oil containing section 72 (see Fig. 2) similar to and positioned alongside frame section 52, and likewise positively driven but at a faster speed than the rolls 40—43. Accordingly, the filaments of the tow S' are stretched or drafted to a certain extent as they traverse a heating means 73 in passing horizontally from the lower roll 43 of group 40—43 to the lower roll 48 of group 45—48. For the purpose of maintaining the filaments definitely separated in the sheet after traversing the heating means 73, serrated bars 74 (see Figs. 13 and 14) are set into diametrically arranged slots 75 in roller 48.

The heating means

As best shown in Fig. 11, the heating means 73 includes a pair of superposed horizontally-arranged plates 76 and 77 which are normally closely spaced and disposed respectively in the upper and lower sections 78 and 79 of a protective housing extending forwardly from casing 19, see Fig. 11, said housing being supported by frame bars 80 and 81 from the top of the base 20 of the apparatus. Electric heating elements 82 and 83 are secured to the respective plates 76 and 77 by clamps 84 and 85, and thermostat bulbs 86 and 87 containing a volatile fluid and lodged in them are relied upon to maintain the temperatures required for softening the filaments in a manner also later on explained. Secured to the plates 76 and 77 at the center are upstanding and pendent clevis lugs 88 and 89 respectively having cross pins 90 and 95 constrained to move in the vertical slots of fixed guides 92 and 93. In order that the plates 76 and 77 may be separated to facilitate initial threading of the tow in the apparatus, I have provided means including a hand lever 95 which is fulcrumed to turn about a fixed pivot 96 on frame bar 80 within casing section 78, and which extends to the exterior through a slot 97 in said casing section. A link 98 has a slotted connection 99 at one end with the stud 90 of the clevis projection 88 on plate 76, and also a pivotal connection 100 with the hand lever at a point beyond the fulcrum of the latter. By means of a horizontal link 101, the pivot stud 100 on hand lever 95 is connected to the upper or long arm of a vertical motion translating lever 102 fulcrumed to rock on a fixed pivot 103, the lower or shorter arm of the latter lever being coupled, by a short link 104, with one end of a horizontal lever 105 medially fulcrumed at 106 within the lower casing section 79. By another short link 107, the other arm of lever 105 is connected to the stud 91 on the clevis 89 of the lower heating plate 77. As a consequence of the arrangement just described, it will be apparent from Fig. 11 that, upon moving the hand lever 95 upward or clockwise about its fulcrum 96, the heating plates 76 and 77 will be retracted upwardly and downwardly respectively into the casing sections 78 and 79 as far as permitted by the stop screws designated 108 and 109. In the treatment of certain kinds of materials, the use of both heating plates 76 and 77 may not be desired or required. For this reason, I have provided means 110 (Figs. 2 and 12) whereby the upper plate 76 can be locked in raised position. The means 110 are identical, each of them including, as shown in Fig. 12, a hand wheel 111 connected to the upper protruding end of a shaft 112 which extends downwardly through a bearing boss 113 at the top of casing section 78. Affixed to the lower end of each shaft 112 is a short horizontal hook 114 for engaging beneath the head of a stud 115 upstanding from heating plate 80. As shown, shaft 112 has a slide fit within an axial counterbore of hand wheel 111, and is regulatable up and down by means of the screw 116 at the top to enable vertical adjustment of the hook 114 as may be required, a spring 117 in compression between the bottom of bearing boss 113 and said hook serving to yielding hold down the hand wheel 111 and thereby facilitate adjusting. After adjustment, hand wheel 111 is made fast to shaft 112 by a set screw 118. Due to the slotted connection 99 between link 98 and the stud 90 of clevis 88 on upper heating plate 80, the latter can be locked in elevated position without interfering with the raising and lowering of the lower plate 81 by means of hand lever 95 and the interposed linkage 101, 102, 104, 105 and 107.

The delivery rolls

The delivery rolls 5 and 6 are rubber sheathed like nip rolls 3 and 4, and are mounted on the outboard ends of shafts 5a and 6a, shaft 5a being rotatively supported in a similar manner in bearings (not shown) in still another frame section 125 which is positioned adjacent frame section 72, see Fig. 2. It is to be understood that the shaft 5a of roll 5 is eccentrically journalled in a sleeve (not shown) which is rotatively adjustable in another hollow oil-containing frame section 125 by means of a hand wheel 126 in a manner similar to that hereinbefore described in connection with feed roll 3.

Breaker means

For the description of this means which is comprehensively designated 7 in Fig. 4, reference will be had to Figs. 17, 19, and 20-22. As there shown, this means comprises a pair of rolls 130 and 131 formed at the outboard ends of shafts 130a and 131a which extend into frame 125. Shaft 131a of the lower breaker roll 131 is rotatively supported in fixed bearings, such as the one shown at 132 in Fig. 17, set into frame section 125. Shaft 130a of the upper breaker roll 130 extends through clearance openings 129 in the side members of frame 125, and is rotatively supported in anti-friction bearings 133 and 134 set into an oil filled sleeve 135. Integral arms 136 and 137 of sleeve 135 are freely fulcrumed on a non-rotating shaft 138 fixed within frame section 125. Arm 137 is extended rearwardly beyond its connection with shaft 138, and are secured to the extension is an upwardly projecting block 139 which protrudes through a clearance opening 140 in the top of frame section 125. Lodged in a socket in the protruding end of block 139 with capacity to turn about its axis, is a pin 141 with a tapped transverse bore engaged by the threaded end portion of an adjusting screw stem 142, the latter passing freely through a diametral hole in a pin 143 which is rockably journalled in upstanding lugs 14a on frame section 125 and which, at its other end, is provided with a manipulating hand wheel 145. A cover 146 screwed to the top of frame section 125 serves to conceal and protect the parts just described except for the hand wheels 142 and 145. Thus, by turning the hand wheel 142 in one direction or the other, the upper breaker roll 130 can be adjusted either closer to or further from the lower beaker roll 131. The breaker rolls 130 and 131 are identical in construction each being longitudinally "V" fluted or grooved, the grooves being equally spaced circumferentially and there being eight of them in the present instance. Alternate grooves of the breaker rolls 130 and 131 are deeper than the others and are recessed at opposite sides as shown for lodgement of replaceable breaker blades 147 which are maintained in assembly by V grooved wedging pieces 148 respectively made fast, with interposition in each instance of a bowed spring strip 149, by draw screws 150. It is to be noted that the grooves in the wedge pieces correspond in size and configuration to the shallower grooves of the breaker rolls 130 and 131, the cross section of said rolls being therefore symmetrical throughout. The purpose of the springs 149 is to dislodge the wedge pieces 148 as the screws 150 are removed for blade replacements when necessary by reason of wear, this operation being thereby made easy and quick of accomplishment. The breaker rolls 130 and 131 are rotated in opposite directions as indicated by the arrows in Fig. 19, with their axes so spaced that the blades of one enter the grooves of the other only part way.

For the purpose of controlling the laterally spread tow and compacting some of the filaments along opposite edges of the sheet as it enters between the breaker rolls 130 and 131, I have installed a means 151 which, as shown in Figs. 2 and 4, is located immediately in advance of said elements as considered with regard to the direction of progression of the sliver in the apparatus. The means 151 is illustrated in detail on a larger scale in Figs. 15 and 16 and, as there shown, is formed in part by a tube 152 whereof one end is engaged over a disk 153 secured by a screw 154 to the front of casing 195. The distal end of tube 152 is closed by a shouldered disk 155, and is removably held in place by a clamp nut 156 threadedly engaged with the distal end of a guide rod 157 which passes freely through both disks and whereof the other end is threadedly anchored in the front wall of casing 19. Mounted on rod 157 within the tube 152 are two slides in the form of elongate collars 158 and 159, and upstanding from the former of these and extending through a longitudinal guide slot 160 in the top of the tube is a finger 161 for engaging the outer side edge of the tow. Rising from slide 159 and likewise extending up through the slot 160 in tube 152 is a stud 162 with a surrounding sleeve 163 to serve as a finger for engaging the inner edge of the sliver. The fingers 162 and 163 are yieldingly drawn toward each other by a spring 164 disposed within tube 152. One end of spring 164 is engaged directly with the finger 162, and the other end of said spring is connected to one end of a wire 165 whereof the other end is secured by a screw 166 to the outer surface of the sleeve 163 on stud 162. As best shown in Fig. 16, sleeve 163 is urged upwardly by a spring 167 for maintenance of diametral notches 168 in its top edge releasably in engagement with a cross pin 169 at the top of stud 162. Accordingly, by depressing sleeve 163 as permitted by spring 167 for release from cross pin 169, said sleeve can be turned about stud 162 to wrap or unwrap the wire and so increase or decrease the tension of spring 164. Tube 152 can be withdrawn from about rod 157 upon removal of clamp nut 156 and the sleeves 158 and 159 thereafter be slipped off said rod in the event that replacement of any of the parts should become necessary.

The delivery rolls

The rubber sheathed delivery nip rolls 9 and 10 are removably secured to shafts 9a and 10a which extend into a carriage 170, see Figs. 1, 2 and 23, shiftable longitudinally of the apparatus on a pair of fixed laterally-spaced guide bars 171 and 172. At its front end, carriage 170 is provided with a split sleeve 173 which directly engages the bar 171 and which is tightened by means of a pair of clamp screws 174. A pendent yoke lug 175 at the back end of carriage 170 over reaches guide bar 172 and bears upon a renewable wear plate 176 screwed to the flattened top of said bar. Pivotally suspended from the extremities of yoke 175 are clamp jaws 177 and 178 having beveled projections for engaging the bar 172 from beneath. The jaws 177 and 178 are operable by means of a screw bolt 179 whereof the head 180 is accessible from the front of the apparatus for wrench application. The diametrically-reduced shank end of bolt 179 passes freely through a transverse hole in a pin 181 rockably engaged within jaw 177, the shoulder 182 of said bolt bearing against the outer side of said pin, and the threaded end portion of said shank engaging a transverse tapped hole in a rockable pin 183 in clamp jaw 178. Turning of screw 179 in one direction will obviously result in relative retraction of clamp jaws 177 and 178 from guide bar 172, and turning of said screw bolt in the opposite direction will be attended by relative approach of said jaws into clamping engagement with said bar. As shown, the bore of roll 9 is slightly larger in diameter than the outboard end of shaft 9a which it surrounds, and is inwardly tapered from opposite ends. Roll 9 is secured in place by a hollowed out wedge plug 184 which fits over the outer end of shaft 9a. As the plug 184 is drawn inward by the screw indicated at 185, it is forced into the outer end taper of the bore in roll 9, and the latter is bodily urged inwardly, with attendant wedging of the taper at the opposite end of the bore over the tapered enlargement 9b of shaft 9a. Rotation of roll 9 relative to shaft 9a is prevented by the key at 186. Dislodgement of the plug 184 is rendered easy by first removing the screw 185 and using it as a back-off means in the tapped axial aperture in said plug.

Shaft 10a of the lower delivery nip roll 10 is rotatively supported by anti-friction bearings 187 set into a fixed oil filled sleeve of carriage 170. Shaft 9a of the upper companion nip roll 9 is journalled in anti-friction bearing 188 eccentrically set into an oil filled sleeve 189 capable of rotative adjustment in carriage 170 to bring said roll into or out of pressure engagement with roll 10. Such adjustment is effected by means of a hand wheel 190 (Fig. 2) affixed to a shaft 191 which is rotatably held in an upstanding projection 192 at the top of carriage 170 and which, see Fig. 23, has a worm 193 thereon in mesh with a worm wheel 194 fast on sleeve 189. A stud 195 (Figs. 23 and 25) recessed into a circumferential groove 196 in sleeve 190 serves, in cooperation with a fixed stop indicated at 197, to restrict rotation of the sleeve to a single turn. As the staple sliver S' leaves delivery rolls 9 and 10, it is directed upwardly to pass over the top edge of a vertically arranged plate 200 (Figs. 1 and 2) sustained by a rod 201 reaching forwardly from carriage 170. Adjustably set upon another rod 202 is a pair of arms with convex guide wings 203 and 204 for engaging the tow and condensing it laterally as it advances to the crimping mechanism 8. It is to be understood that the lower delivery roll 10a and the nip rolls 3, 4 and 5, 6 are all mounted on their shafts in the same way as above described in connection with the upper delivery roll 9.

*The crimping mechanism*

This mechanism has a separate casing 205 which is stationarily supported on base housing 20 at the right hand end of the latter as seen in Figs. 1 and 2. Mounted atop casing 205 is a block 206 wherefrom extends forwardly a rod 207 about which the staple sliver S' passes after leaving plate 200. Also extending forwardly from block 206 is a second rod 208 with two spaced upstanding fingers 209 thereon between which the sliver is guided and at the same time further contracted or condensed laterally. After rounding rod 207, the sliver passes downwardly through a guide 210 at the front of casing 205, said guide having a tapering throat 211 whereby the sliver is still further contracted or condensed in readiness for the crimping. As it emerges from guide, the sliver is fed downwardly by a pair of nip rolls 212 and 213, and crowded into the vertical passage 214 in a small box-like element 215 at the front of casing 205. A pivoted member 216 forming one wall of box-like element 215 is urged inwardly by a spring 217 for capacity to yield, from time to time, for release of the crimped sliver. The crimping results as a consequence of crowding the tow within the passage 215 and the constant vibratory action of the member 216. The pressure of spring 217 is regulatable by means of a screw 219 threadedly engaged in the central boss 220 of a retractable supporting bar 221 which is hingedly connected at one end to element 215 as at 222, and which is securable at the other end by means designated 223.

*The drive mechanism*

The drive mechanism of the apparatus includes an electric motor 230 (Fig. 3) which is located within the enclosed base 20 of the apparatus, and which, through a belt 231, imparts rotation to the input shaft 232 of a conventional gear reduction unit indicated at 233. The pulley 230a on the shaft of motor 230 is to be considered as of a two disk laterally expandable V groove type. Motor 230 is adjustable relative to speed reducer 233 for belt tensioning and variable speed delivery by means of a screw spindle 234 which is operable by a hand wheel 235 on a shaft 236 protruding through base housing 20 at one end, through a sprocket chain connection 237. Rotary motion is communicated from the output shaft 238 of the reduction gear unit 233 by another chain 239 to a sprocket 240 on a main drive shaft 240a journalled in housing. Through a pair of intermeshing gears 241 and 242, rotary motion is transmitted to an idler shaft 243, and from thence through another gear 245, to a shaft 246. Through a train of gears 247, 248, 249 and 250 rotary motion is transmitted, in turn, to the shaft 48a of auxiliary roll 48, and from gear 250 through another train of gears 251, 252 and 253 to the shafts 47a, 46a and 45a of auxiliary rolls 47, 46 and 45. Affixed to shaft 46a of auxiliary roll 46 is a second gear 255 which meshes with and drives a gear 256 on the shaft 6a of the lower delivery nip roll 5. Through still another train of gears 257, 258, 259, 260, 261 and 262, shaft 42a of roll 42 is driven from the gear 251 on shaft 47a of roll 47. A second gear 263 on shaft 42a of roll 42 drives a gear 264 on the shaft 43a of roll 43, and also a gear 265 on shaft 41a of roll 41 from which latter rotary motion is transmitted to an intermeshing gear 266 on shaft 40a of roll 40. Shaft 4a of lower feed nip roll 4 is driven by a pair of intermeshing gears 267 and 268 from shaft 41a of roll 41. As shown in Fig. 26, the gears 260 and 261 are keyed to the rear end of a shaft 260a which revolves freely within ball bearings 269 in frame section 72, and it is to be understood that gear shafts 257a and 258a are similarly supported in said frame section 72. Shaft 131a of the lower breaker roll 131 is driven from shaft 243 through a train of gears 270, 271, 272 and 273. Meshing with gear 273 is a gear 274 (see Fig. 21) which rotates freely about the inner end of shaft 138 and which is supported by ball bearings 275 and 276. A sprocket pinion 277 fixed on the hub of gear 274 is connected by a chain 278 to a sprocket pinion 279 affixed to the inner end of the shaft 130a of upper breaker bar 130, the latter being thereby driven at the same speed as the lower breaker roll 131 but in the opposite direction. Fast on main drive shaft 240 is a sprocket wheel 280 for an endless chain 281 which is trained about a sprocket wheel 282 fast on shaft 10a of lower delivery nip roll 10, a sprocket wheel 283 fast on the shaft 9a of the upper delivery nip roll 9, a sprocket wheel 284 (Figs. 2, 3 and 31) fast on a shaft 285 rotatively supported by ball bearings 286, 287 within a frame section 288 at the rear of the crimper casing 205, and a pair of take up idler sprockets 289 and 290. Also fast on shaft 285 (Fig. 31) is a sprocket wheel 291 which, through a chain 292 imparts motion to a sprocket wheel 293 on the rear end of a parallel shaft 294 rotatively supported by ball bearings 295 and 296 in frame section 288. Chain 292 also passes about a take up idler sprocket shown at 297 in Figs. 3 and 31. Rotary motion is transmitted from shaft 294 by a pair of intermeshing gears 298 and 299 to the shaft 212a of crimper nip roll 212. As shown in Figs. 31 and 32, the companion crimper nip roll 213 is driven from shaft 212a through a train of gears 300, 301, 302 and 303, the gears 301 and 302 revolving freely about shafts 301a and 302a fixedly positioned within crimper casing 205. Due to the use of anti-friction bearings throughout for the revolving parts, the apparatus obviously requires but a minimum of power for its operation.

Roll brushing means

Individually associated with each of the rolls of the auxiliary groups 40—43 and 45—48 and also with each of the nip rolls 5, 6 and 9 as shown in Figs. 1 and 2 and as detailed in Fig. 28, is a reversible brush 310 consisting of a block 311 with bristles 312 projecting from opposite sides thereof. The block 311 of each brush 310 is recessed into a channel section holder bar 313 with capacity for removal of the brush endwise from the holder. The inner ends of the holders are closed by webs 314 which are slotted as at 315 to engage over pairs of threaded studs 316 projecting forwardly, in horizontally spaced relation, from the front of casing 19 and from carriage 170, the holders being made fast by clamp nuts 317 engaged upon said studs. As a consequence of this construction, the holders 313 can be adjusted relative to the corresponding rolls to take up the wear of the bristles which, as shown in Fig. 28, are trimmed to fit the contours of the rolls.

The suction means

This means, see Figs. 1, 2 and 17–19 includes an elongated hood-like suction box 320 which extends longitudinally over the upper breaker roll 130 in close proximity thereto. Suction box 320 is constructed preferably of transparent plastic to arcuate cross sectional configuration and has an inlet opening 321 in the bottom thereof. At its outer end, box 320 is connected to and supported by a tube 322 telescopically engaged over the top of a pipe 323 which extends downwardly into the base housing from the front to a collecting trap 324 within said housing. The air is drawn from the trap by a suction blower 325 driven by an electric motor 326.

Operation

In preparation for starting the apparatus, the upper nip rolls 3, 5 and 9 are upwardly retracted from the mating lower nip rolls 4, 6 and 10 by manipulation of the hand wheels 62, 126 and 190, and the plates 76 and 77 of the heating means 73 are separated by manipulation of the hand lever 95 in the manner hereinbefore described. With this preparation, the tow S is threaded up and down about the successive snubber bars 12—17, then over nip roll 4, then downwardly back and forth about the rolls of group 40—43, then horizontally between the plates 76 and 77 of heater device 73, then upwardly back and forth about the rolls 48, 47, 46, 45, then over nip roll 6 and horizontally between the breaker rolls 130 and 131 and under nip roll 9, then over the top edge of plate 200 and horizontally between the guide wings 203 and 204 and over the guide rod 207 at the top of the crimper casing 205 and finally downward through the guide 210 to the nip rolls 212 and 213 of the crimper. This threading is obviously accomplished easily and quickly since the snubber bars and the several rolls are all accessible from the front of the apparatus. With the apparatus now threaded, the hand wheels 62, 126 and 190 are turned in the opposite direction to depress the nip rolls 3, 5 and 9 into operative relation to the lower nip rolls 4, 6 and 10, and current is supplied to the heating device 73. All being now in readiness, the plates 76 and 77 of the heating device are first brought into closer proximity by lowering hand lever 95, whereupon the motors 230 and 326 are started, the former to drive the various rolls through the transmission gearing, and the latter to drive the suction blower 325. In the travel of the tow S about the snubber bars, it is laterally spread into sheet form and properly centered before reaching nip rolls 3 and 4, by the action of the adjustable bars 14 and 16. In passing from nip rolls 3, 4 to nip rolls 5, 6 which latter, as already stated, rotate at a higher speed, the filaments of the tow are stretched, that is, drafted while maintained under effective control by the driven rolls of the groups 40—43 and 45—48, the drafting being facilitated by the softening of the filaments incident to traverse of the heating means 73. As the tow advances from nip rolls 5, 6 to the delivery nip rolls 9—10, the filaments are strained due to the higher speed of the latter rolls, and at the same time are deflected from a straight path in passing between the breaker rolls 130, 131, being thereby broken up into fibers of staple length, the breaking being accomplished without change in the continuity of the sliver. Enroute from the delivery nip rolls 9 and 10 to the crimper 8, the staple sliver S' is progressively condensed, as previously explained, before entering between the feed rolls 212 and 213 of said crimper. Any fibers which may stray from the sliver at the instant of breaking are immediately drawn into suction box 320 and so prevented from being wrapped about and clogging the breaker rolls 130 and 131. Straying of fibers from the side edge regions of sliver is effectively precluded by the bunching action of the fingers 161 and 163 as in Fig. 15 before these filaments enter between the breaker rolls. All the while, the brushes 310 serve to intercept any fly which may reach the various rolls and prevent it from being wrapped about them.

The spur gears of the drive mechanism are all of the same pitch, and the relative speeds of the nip rolls and the breaker rolls can be varied by substituting for the couples 261 and 262, 247 and 248, and 270 and 271 of others of different ratios, these gears being all in the clear and all readily accessible upon opening of the door 19a at the back of casing 19, see Fig. 2. Similarly, the relative speeds of the delivery rolls 9, 10 and the nip rolls 212, 213 of the crimper 8 can be varied by interchange of the chain sprockets 291 and 293 which are readily accessible upon opening of another door 19b at the back of casing 19. Lastly, the output of the apparatus can be varied by positionally adjusting motor 230 relative to gear reduction unit 233 in a manner readily understood from Fig. 3.

Motor and heater controls

For controlling the drive and suction blower motors 230 and 326, I have shown in Fig. 1 at the front of the apparatus, duplicate sets of start, jog and stop push button switches 330, 331 and 332 which are enclosed in separate boxes 333 and 334 at the tops of hollow bracket arms 335 and 336 reaching upwardly from base 20. The heating elements 82 and 83 of heater 73 are controlled, likewise from the front of the apparatus, by separate automatic switch devices 337 and 338 affixed to the front wall of housing 19 and provided with temperature regulating knobs 339 and 340. Alternating current for operation of the motors and the heater is supplied, as shown in the diagram of Fig. 33, from the mains 341, 342 and 343 of a three phase power line. From the diagram it will be seen that, by pushing the start button of either switch unit 333 or 334, the coil 344 of the relay designated 345 will be energized and the relay closed to permit current flow to motors 230 and 326. Current flow to the heating elements 82 and 83 is initiated by turning the knobs 339 and 340 of the controls 337 and 338 which are duplicates of each other and which are of a well known commercially available type, each comprising a switch finger 346 with a clevised tail 347 for shifting a bellows 348, connected, by a flexible tube 349, to the thermostat bulb 86 (or 87) in the corresponding heating plate 76 (or 77), relative to a normally closed spring backed contact 350. With this arrangement, it will be apparent that the time of opening of contact 350 by the bellows 348 will be delayed in accordance with the setting of switch finger 346 and so control current flow to the heating elements for maintenance of correspondingly different temperatures in the heater plates. Associated with the controls 337 and 338 are telltale light bulbs 351 which are visible at the front of the boxes of these controls. As shown, the motor controlling switches 333 and 334 are connected in parallel through relay 344 across one phase of the power line, and the temperature controls 337 and 338 are connected in parallel across another phase of the power line.

Having thus described my invention, I claim:

1. In apparatus for converting tow consisting of multiple continuous synthetic textile filaments into a sliver of staple fibers, pairs of differentially driven upper and lower horizontal axis feed and delivery nip rolls in spaced relation; a cooperative pair of rotary breaker elements in the interval between the feed and the delivery rolls; means for laterally spreading the filaments enroute to the feed rolls; and an auxiliary roll rotated at a surface speed equal to that of the feed rolls having notched inset bars at circumferentially spaced intervals for definitely separating the filaments after spreading thereof and before entry between the feed rolls.

2. In apparatus for converting tow consisting of multiple continuous synthetic textile filaments into a sliver of staple fibers, pairs of differentially driven upper and lower horizontal axis feed and delivery nip rolls in spaced relation; a cooperative pair of rotary breaker elements in the interval between the feed and the delivery rolls; means for laterally spreading the sliver enroute to the feed rolls; and means disposed between the feed rolls and the breaker elements for laterally bunching some of the filaments along opposite edges of the sheet before entry between the breaker elements, said means including a fixed guide bar, slides free on said bar and having projecting fingers for engaging the opposite side edges of the sheet, and regulatable spring tensioning means tending to draw the slides toward each other.

3. In apparatus for converting tow consisting of multiple continuous synthetic textile filaments into a sliver of staple fibers, pairs of differentially driven upper and lower horizontal axis feed and delivery nip rolls in spaced relation; a cooperative pair of upper and lower rotary horizontal axis breaker rolls in the interval between the feed and delivery rolls for breaking up the filaments into fibers of staple length; a pair of laterally-spaced supporting frames; and anti-friction bearings in the respective frames by which the feed and nip rolls and the breaker rolls are all rotatively supported at one end only.

4. Apparatus, according to claim 3, wherein the feed and delivery rolls are removably secured to individual supporting shafts.

5. Apparatus, according to claim 3, wherein the feed and delivery rolls are sheathed with rubber or the like, and further including separate means for adjusting the upper feed and delivery rolls relative to the lower feed and delivery rolls as and for the purpose described.

6. Apparatus, according to claim 3, wherein the bearings for the lower feed and delivery rolls are stationary; wherein the bearings for the upper feed and delivery rolls are sustained with capacity for retraction from the lower rolls; and further including means for individually moving said bearings as and for the purpose described.

7. Apparatus, according to claim 3, wherein the upper feed and delivery rolls are removably secured to shafts freely rotative in bearings eccentrically set into sleeves; wherein the sleeves are rotatively adjustable in fixed bearings; and further including separate means for adjusting the sleeves to bring said lower rolls into and out of operative relation to said upper rolls as and for the purpose described.

8. Apparatus, according to claim 3, wherein the upper feed and delivery rolls are removably secured to shafts freely rotative in bearings eccentrically set into sleeves; wherein the sleeves are rotatively adjustable in fixed bearings; and further including separate means for adjusting the sleeves to bring said lower rolls into and out of operative relation to said upper rolls as and for the purpose described, each such adjusting means including a worm wheel on the corresponding sleeve and a manually operable worm held against axial movement and meshing with the worm wheel.

9. Apparatus, according to claim 3, wherein the bearing for the lower breaker element is stationarily supported; wherein the bearing for upper breaker element is supported by an arm free on a stationarily non-rotating supported shaft; and wherein said bearing is rotatively adjustable about the fixed shaft by means of a manually-operable regulating screw held against axial movement and threadedly engaged in said arm to move the upper breaker element bodily relative to the lower breaker element as and for the purpose described.

10. Apparatus, according to claim 3, wherein each breaker element comprises a bar with an even number of longitudinally extending V section grooves which are uniformly spaced circumferentially and of which alternate grooves are deeper than the others, each of the deeper grooves having a recess in one side; replaceable breaker blades fitting into said recesses; wedge pieces having a V cross section corresponding to that of the shallower grooves; and screws for drawing the wedge pieces into the deeper grooves to clampingly hold the blades in assembly.

11. Apparatus, according to claim 3, wherein each breaker element comprises a bar with an even number of longitudinally extending V section grooves which are uniformly spaced circumferentially and of which alternate grooves are deeper than the others, the deeper grooves each having a recess in one side; replaceable breaker blades fitting into said recesses; wedge pieces having a V cross section corresponding to that of the shallower grooves; screws for drawing the wedge pieces into the deeper grooves to clampingly hold the blades in assembly, and bowed spring strips interposed between the respective wedge pieces and the bottoms of the corresponding grooves for outwardly displacing the wedge pieces as the screws are backed off to facilitate removal and replacement of the blades when necessary by reason of wear.

12. Apparatus, according to claim 3, further including an apertured suction box disposed in proximity to breaker elements for drawing off stray fibers released from the sliver during breaking of the filaments.

13. Apparatus, according to claim 3, further including individual brushes for wiping the exposed surfaces of the feed and delivery rolls, said brushes having bristles fixed in and projecting from opposite sides of foundation blocks, and stationary channel section holders in which the brushes are removably held with capacity for being reversed in position relative to the rolls.

14. Apparatus, according to claim 3, further including a pair of advance nip rolls spaced from the feed rolls and rotated at a slower speed; and a heating device for softening the filaments to facilitate stretching thereof en route from the advance nip rolls to the feed rolls.

15. Apparatus, according to claim 3, further including a pair of advance nip rolls spaced from the feed rolls and rotating at a slower speed; a heating device for softening the filaments to facilitate stretching thereof en route from the advance nip rolls to the feed rolls; a group of vertically arranged auxiliary rolls having a surface speed equal to that of the advance roll and about which the filaments are passed back and forth prior to traversing the heating device; and a similar group of auxiliary rolls having a surface speed equal to that of the feed rolls and about which the filaments are passed back and forth after traversing the heating device and before entering between the feed rolls.

16. Apparatus, according to claim 3, further including a pair of advance nip rolls spaced from the feed rolls and rotating at a slower speed; a heating device for softening the filaments to facilitate stretching thereof en route from the advance nip rolls to the feed rolls; a group of vertically arranged auxiliary rolls having a surface speed equal to that of the advance rolls and about which the filaments are passed back and forth prior to traversing the heating device; and a similar group of auxiliary rolls having a surface speed equal to that of the feed roll and about which the filaments are passed back and forth after traversing the heating device and before entering between the feed rolls, the last of the latter group of auxiliary feed rolls having laterally-spaced circumferential grooves for definitely spacing the filaments before entry between the delivery rolls.

17. Apparatus, according to claim 3, further including a pair of advance nip rolls spaced from the feed rolls and rotated at a slower speed; and a heating device for softening the filaments to facilitate stretching thereof en route from the advance nip rolls to the feed rolls, said device including a pair of heated upper and lower plates between which the filaments are passed.

18. Apparatus, according to claim 3, further including a pair of advance nip rolls spaced from the feed rolls and rotated at a slower speed; a heating device for softening the filaments to facilitate stretching thereof en route from the advance nip rolls to the feed rolls, said device including a pair of heated upper and lower plates between which the filaments are passed; and means whereby the heated plates can be relatively adjusted up and down to vary the distance between them.

19. Apparatus, according to claim 3, further including a pair of advance nip rolls spaced from the feed rolls and rotating at a slower speed; and a heating device for softening the filaments to facilitate stretching thereof en route from the advance nip rolls to the feed rolls, said device including a pair of heated upper and lower plates between which the filaments are passed, and means for supporting said feed rolls and said plates at one end only like said feed and delivery rolls and said breaker elements.

20. Apparatus, according to claim 3, further including a pair of advance nip rolls spaced from the feed rolls and rotated at a slower speed; and a heating device for softening the filaments to facilitate stretching thereof en route from the advance nip rolls to the feed rolls, said device including a pair of heated upper and lower plates between which the filaments are passed, and means whereby the upper plate, when its use is not required, can be raised and locked in an inoperative position relative to the lower plate.

21. Apparatus, according to claim 3, further including a pair of advance nip rolls spaced from the feed rolls and rotated at a slower speed; and a heating device for softening the filaments to facilitate stretching thereof en route from the advance nip rolls to the feed rolls, said device including a pair of heated upper and lower plates between which the filaments are passed, electric means for individually heating the plates, and independently regulatable automatically-operable means for interrupting current flow to the electric means upon heating of the plates to prescribed temperatures.

22. In apparatus for converting tow consisting of multiple continuous textile filaments of nylon or the like into a sliver of staple fibers, pairs of upper and lower horizontal axis nip feed and delivery rolls in spaced relation; a cooperative pair of rotary horizontal axis breaker elements in the interval between the feed and delivery rolls; means whereby the delivery rolls can be positionally adjusted toward or away from the breaker elements; a pair of advance nip rolls spaced forwardly of the feed rolls as considered with respect to the direction of progression of the tow in the apparatus; a device for heating the filaments in the interval between the advance nip rolls and the feed rolls; and drive mechanism for rotating the feed rolls at a faster rate than the advance rolls, the breaker elements at a faster rate than the feed rolls and the delivery rolls at a faster rate than the breaker elements, said drive means including a main drive shaft, a train of intermeshing spur gears for transmitting rotary motion from the drive shaft to the lower advance nip roll, the lower feed roll and to both of the breaker elements, and a sprocket chain system for transmitting rotary motion to the lower delivery roll, permitting the delivery rolls to be positionally adjusted relative to the breaker elements as aforesaid.

23. Apparatus, according to claim 22, wherein certain intermeshing pairs of gears in the gear train can be interchanged with others of different speed ratios.

24. In apparatus for converting tow consisting of multiple continuous textile filaments of nylon or the like into a sliver of staple fibers, pairs of upper and lower horizontal axis nip feed and delivery rolls in spaced relation; a cooperative pair of horizontal axis breaker elements in the interval between the feed and delivery rolls; means whereby the delivery rolls can be positionally adjusted toward or away from the breaker rolls; a pair of advance nip rolls spaced forwardly of the feed rolls as considered with respect to the direction of progression of the tow in the apparatus, a device for heating the filaments in the interval between the advance nip rolls and the feed rolls; a group of vertically arranged auxiliary rolls about which the tow is passed back and forth enroute from the advance nip rolls to the heating device; a group of vertically arranged auxiliary rolls about which the tow is passed back and forth enroute from the heating device to the delivery rolls; and drive means for rotating the first mentioned group of auxiliary rolls at the same surface speed as the advance nip rolls, the breaker rolls at a faster speed than the advance nip rolls, and the second mentioned group of auxiliary rolls and the delivery rolls at the same surface speed but at a faster rate than the breaker elements, said drive means including a main drive shaft, a train of intermeshing gears for transmitting rotary motion from the drive shaft to the advance nip rolls, to the two groups of auxiliary rolls, the feed rolls and to the breaker rolls, and a sprocket chain system for transmitting rotary motion from the drive shaft to the delivery rolls and permitting the delivery rolls to be positionally adjusted relative to the breaker elements as aforesaid.

25. Apparatus, according to claim 24, wherein certain pairs of intermeshing gears in the gear train can be interchanged with others of different speed ratios.

26. Apparatus, according to claim 24, further including a motor and a regulatable variable speed means for applying power to the main shaft of the drive means.

27. In apparatus for converting tow consisting of multiple continuous synthetic filaments into a sliver of staple fibers, pairs of differently-driven upper and lower horizontal axis feed and delivery nip rolls in spaced relation; a cooperative pair of upper and lower horizontal axis rotary breaker elements in the interval between the feed and the delivery rolls; and a system of snubber bars over and under alternate ones of which the tow is passed enroute to the feed rolls, said feed and delivery rolls, breaker elements and bars being all supported at one end only, and one of said bars being bowed and rotatively adjustable to variably spread the filaments laterally into the form of sheet prior to entry between the feed rolls.

28. In apparatus for converting tow consisting of multiple continuous synthetic filaments into a sliver of staple fibers, pairs of differently-driven upper and lower horizontal axis feed and delivery nip rolls in spaced relation, a cooperative pair of upper and lower horizontal axis rotary breaker elements in the interval between the feed and the delivery rolls; and a system of snubber bars over and under alternate ones of which the tow is passed en-route to the feed rolls, said feed and delivery rolls, breaker elements and bars being all supported at one end only, one of said bars being bowed and rotatively adjustable to variably spread the filaments laterally into the form of sheet prior to entry between the feed rolls, and another of said bars being inclined at a slight angle and rotatively adjustable to center the sheet relative to the feed rolls.

References Cited in the file of this patent

UNITED STATES PATENTS

| Number | Name | Date |
|---|---|---|
| 2,117,412 | Freeman | May 17, 1938 |
| 2,234,540 | Fryer | Mar. 11, 1941 |
| 2,247,529 | Taylor et al. | July 1, 1941 |
| 2,249,809 | Dickie et al. | July 22, 1941 |
| 2,254,059 | Bird | Aug. 26, 1941 |
| 2,261,259 | Kosslinger et al. | Nov. 4, 1941 |
| 2,348,182 | Slayter | May 2, 1944 |
| 2,419,320 | Lohrke | Apr. 22, 1947 |
| 2,432,355 | Truitt | Dec. 9, 1947 |
| 2,611,931 | Wildbolz | Sept. 30, 1952 |
| 2,635,295 | De Lacotte | Apr. 21, 1953 |
| 2,657,433 | Merriman | Nov. 3, 1953 |